Sept. 9, 1952  L. G. TATRO  2,609,739
ROLL FILM HOLDER FOR PRESS TYPE CAMERAS
Filed Aug. 27, 1949  2 SHEETS—SHEET 1
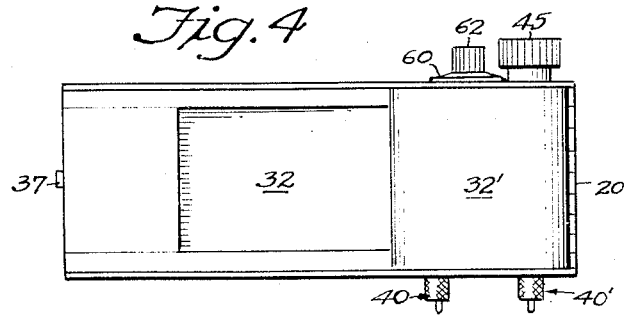
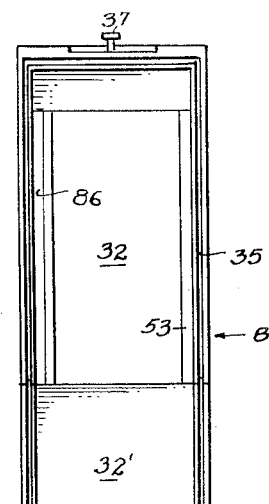
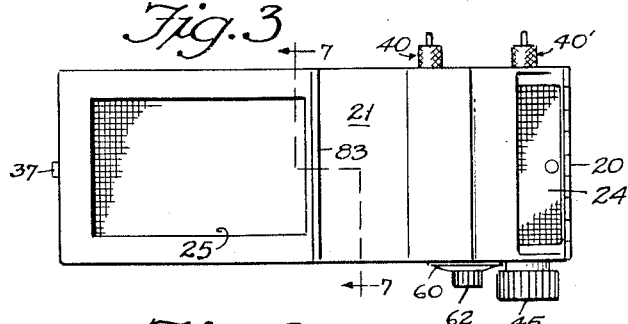
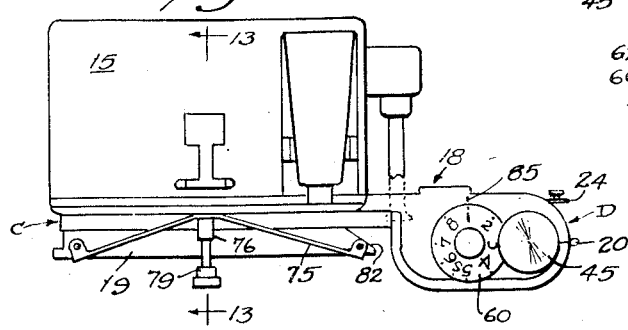
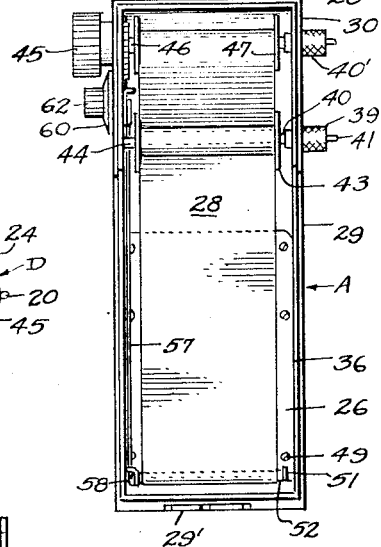
INVENTOR.
Lysle G. Tatro
BY Lynn Latta
—ATTORNEY—

Sept. 9, 1952　　　　　L. G. TATRO　　　　　2,609,739
ROLL FILM HOLDER FOR PRESS TYPE CAMERAS
Filed Aug. 27, 1949　　　　　　　　　　　2 SHEETS—SHEET 2
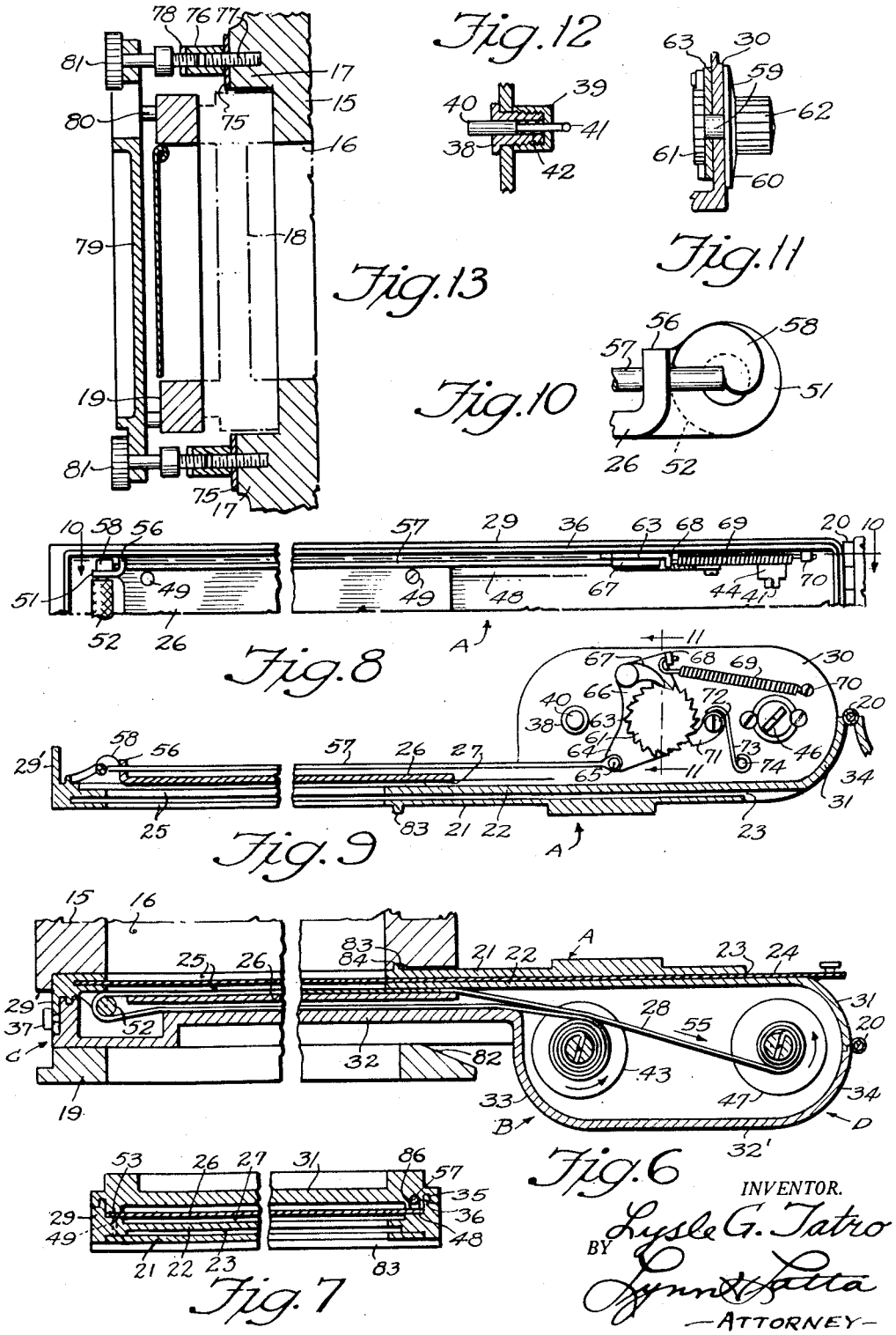

Patented Sept. 9, 1952

2,609,739

UNITED STATES PATENT OFFICE 2,609,739

ROLL FILM HOLDER FOR PRESS TYPE CAMERAS

Lysle G. Tatro, Los Angeles, Calif.

Application August 27, 1949, Serial No. 112,681

8 Claims. (Cl. 95—34)

This invention relates to a roll film holder for a press type camera. Its general object is to provide, as an accessory for a press type camera, a holder having a portion for insertion into a camera and another portion for containing two film spools, with the film travelling from one spool into the portion that is in the camera and back to the other spool.

An object of the invention is to provide a counter adapted to count the number of exposures and to accurately indicate the proper position of the film for each new exposure. Another object is to provide a novel and improved arrangement for braking the spool that holds the unexposed film, to prevent coasting thereof.

Another object is to provide an improved mounting arrangement for the back member of a press type camera.

Other objects will become apparent in the ensuing specifications and appended drawings in which:

Fig. 1 is a rear view of a press type camera with a film holding attachment embodying my invention;

Fig. 2 is a plan view of the same;

Fig. 3 is a front view of the film holder;

Fig. 4 is a rear view of the film holder;

Fig. 5 is a view of the film holder opened up to display its interior;

Fig. 6 is a horizontal sectional view taken on the line 6—6 of Fig. 1;

Fig. 7 is a transverse sectional view taken on the line 7—7 of Fig. 3;

Fig. 8 is a detail, sectional plan view of one side of the holder, opened;

Fig. 9 is a longitudinal sectional view taken on the line 9—9 of Fig. 8;

Fig. 10 is a detail of the counter actuating cam, taken as indicated by the line 10—10 of Fig. 8;

Fig. 11 is a detail sectional view taken on the line 11—11 of Fig. 9 and illustrating a portion of the counting mechanism;

Fig. 12 is a detail sectional view of one of the retractable spool trunnions; and Fig. 13 is a detail sectional view taken on the line 13—13 of Fig. 1.

As an example of one form in which the invention may be embodied, I have shown in the drawings a press type camera which in general embodies a casing or light box 15 having at its rear side an exposure opening 16 (Figs. 6 and 13) having, above and below said opening 16, flanges 17 adapted to receive between them a slide holder or film 18, and having a back member 19 for holding the slide holder or film holder 18 in position between the flanges 17 and in registry with the exposure opening 16.

Film holder 17 includes generally a flat shallow portion C extending from one end thereof to an intermediate point, and a deeper spool housing portion D extending from that intermediate point to the other end thereof. The shallow portion C is adapted to be received in the camera and the portion D contains the film spools. The film holder 17 has a housing which is constructed in two sections A and B, joined by a hinge 20. Body section A (Fig. 6) has a pair of forward walls 21 and 22 disposed in closely adjacent, parallel planes, spaced slightly apart to provide a slot 23 in which is received a dark slide 24. The forward walls 21, 22 are cut away to provide an exposure opening 25 adapted to register with the exposure opening 16 of the camera. Behind the exposure opening 25 is a platen 26 which is parallel to wall 22 and spaced slightly rearwardly therefrom to provide a space 27 through which a film may travel, with a section of the film bearing against the forward face of the platen 26 in a position to be exposed through exposure openings 16 and 25. From the respective sides of forward walls 21, 22, housing body section B has side walls 29 extending rearwardly, and from the outer end of the shallow housing portion C of body section A, an end wall 29′ extends rearwardly. In the spool housing portion D of the body section A, side walls 29 are broadened to the full depth of portion D, as indicated in Fig. 9 at 30. At the outer end of housing portion D, body section A has a quarter cylindrical end wall 31 extending from wall 22 to hinge 20.

Cover section B includes a rear wall 32 for the shallow housing portion C, a rear wall 32′ for spool housing portion D, and quarter cylindrical end wall portions 33 and 34 for spool housing section D, extending from rear wall 32 to rear wall 32′ and from rear wall 32′ to hinge 20 respectively. The margins of wall portions 32, 33, 32′ and 34 are formed with light sealing channels 35 which receive light sealing flanges 36 at the margins of walls 29, 30, 29′, and 31 of body section A. The outer end of wall member 32 is provided with a securing element 37 which coacts with end wall 29′ of body section A to secure the sections A and B together. Mounted in an opening in a side wall member 30, adjacent inner end wall member 33 of film housing section D is a retractable trunnion unit shown in Fig. 12. Such unit includes a bearing bushing 38 secured in wall member 30 by a cap 39 threaded on its outer end, a trunnion 40 slidably mounted in bushing 38 and having a stem 41 projecting through cap 39, and a spring 42 acting under compression between cap 39 and trunnion 40 to urge the latter inwardly. This unit may be of conventional construction and forms no part of the present invention. A second trunnion 44 (Fig. 5) is fixed in the other end wall member 30 in a position aligned with the retractable trunnion 40. An idler, or unexposed film spool 43 is journalled on these two trunnions, adjacent end wall member 33.

Adjacent the outer end wall members 31, 34 of spool housing section D, a second retractable trunnion unit 40' similar to that just described, is mounted in the same end wall member 30. Mounted in the other end wall 30, in alignment with retractable trunnion unit 40a, is a winding spindle (Fig. 5) having a knob 45 for manual actuation thereof and a flattened inner end 46 for driving clutching engagement with a winding spool 47.

Platen 26 is preferably of sheet metal, mounted in body housing section A upon shoulders 48 projecting inwardly from side walls 29 thereof. Platen 26 may be secured to shoulders 48 by screws 49 (Fig. 8). At the outer end of platen 26, the corners thereof have ears 51 in which are journalled the respective ends of an idler roller 52. Ears 51 are disposed at right angles to the plane of platen 26 and project beyond the end thereof in order that roller 52 may lie in the plane of the platen.

Film 28 leaves the forward side of unexposed film spool 43, passes around the inner extremity of wall 32 and between shoulders 53 (Fig. 7) at the sides thereof, passes around idler roller 52 and back through space 27, bearing against the forward face of platen 26, and thence extends diagonally from the inner end of platen 26 to the rear side of winding spool 47. The stretch of film extending from the end of platen 26 to spool 47 bears against the film leaving spool 43. The direction of travel of the film as it is advanced from one exposure to another, is indicated by arrow 55 in Fig. 6, and the direction of rotation of the spools, as viewed in Fig. 6 is counterclockwise as indicated by the arrows. It may now be noted that the movement of the film from the end of platen 26 to winding spool 47 is opposed to the movement of the film leaving spool 43, whereby the drag of the stretch of exposed film against spool 43 resists the unwinding rotation thereof and tends to rotate spool 43 in the opposite direction and to wind the film thereon. Thus it is possible to dispense with any braking mechanism for spool 43, and there is a constant action against this spool tending to wind it up at all times when the film is being moved.

The invention provides a counter mechanism which is operated directly from the film so as to register accurately. The film movement is transferred to the counter mechanism through roller 52, the surface of which is roughened, as by knurling, in order to prevent any slippage between the film and the roller. At one end of roller 52, bearing ear 51 is extended to form a bearing ear 56 which is disposed at right angles to ear 51. Slidably mounted in ear 56 is one end of a push rod 57. A cam 58 on the end of roller 52 (Fig. 10) bears against the projecting end of rod 57 so that, as roller 52 rotates, rod 57 will be reciprocated. Cam 58 may be of a simple spiral type as illustrated in Fig. 10. When the holder is closed, push rod 57 is received in a channel 86 in a shoulder 57.

Mounted in upper wall member 30, intermediate winding spindle 46 and retractable trunnion 40, is a counter assembly which includes a shaft 59 journalled in an opening in the wall 30, an indicator dial 60 secured to the outer end of shaft 59, and a ratchet wheel 61 secured to the inner end of shaft 59. Indicator dial 60 also includes a setting knob 62, and is provided with indicator numerals 1–8 inclusive, cooperable with an indicator mark 85 (Fig. 2) to indicate film position. Interposed between ratchet wheel 61 and wall member 30 and journalled on trunnion 59, is a crank 63 having a forwardly extending arm 64 to which the other end of push rod 57 is pivoted at 65. Crank 63 has a rearwardly extending arm 66 to which is pivoted a pawl 67. Crank 63 has an ear 68 into which is hooked one end of a tension spring 69, the other end of spring 69 being anchored to wall 30 at 70. A holding pawl 71, pivoted to wall 30 as by means of a screw 72, is yieldingly urged against ratchet wheel 61 by a spring 73 one end of which is anchored in pawl 71 and the other end of which is anchored to wall 30 as by means of a pin 74.

My improved plate holder clamp (Figs. 1, 2 and 13) comprises a pair of leaf springs 75 each pivoted at its respective ends, to the respective ends of back member 19. The central portion of each spring 75 is anchored by an internally threaded sleeve 76 threaded onto a stud 77 that is mounted in a respective flange 17. Sleeves 76 may have at their outer ends screw driver slots 78 for coaction with a screw driver, in order that they may be tightened down against springs 75, or loosened therefrom.

A pressure bar 79, having feet 80 for bearing against back member 19, has at its respective ends openings through which are extended thumb screws 81, threaded into the outer ends of sleeves 76.

Back member 19 has its right end conventionally bevelled as at 82 to facilitate entry of shallow portion C of film holder 18 between the back member and the camera casing 15. Leaf springs 75 yieldingly oppose the rearward springing of back member 19 as the film holder is inserted into the camera and, as the holder reaches its operative position in the camera, presses the holder forwardly, causing a flange 83 on forward wall 21 to enter a groove 84 in casing 15. Flange 83 thereafter cooperates with groove 84 to hold the holder in its proper operative position.

During the insertion of the film holder, screws 81 are backed off so that pressure bar 79 does not interfere with the rearward yielding of back member 19. After insertion of the holder, screws 81 are tightened up to draw pressure bar 79 tightly against the holder 18, positively holding it in its operative position, and preventing any accidental dislodgement of the holder from the camera. It thus becomes possible to carry the camera by its handle 85 (Fig. 1) with the film holder 17 hanging downwardly, without running any risk of the film holder dropping out of the camera.

The counter mechanism operates as follows: When the holder is loaded, spool 47 is initially rotated until the conventional starting mark appearing on the film arrives at a predetermined position in casing section A. The dial is then rotated from knob 62 so as to rotate ratchet wheel 63 clockwise as viewed in Fig. 9, ratcheting it against pawls 67 and 71, until an "S" character, which appears on dial 60 between the characters 5 and 6 on the dial, is opposite indicator mark 85. The holder is then closed, and knob 45 is turned, advancing the film, until the indicator character 1 is opposite mark 85. The film is then in position for the first exposure. After the exposure has been made, knob 45 is again turned until indicator numeral 2 appears opposite mark 85, when the film will be in position for the next exposure. During the movement from position 1 to position 2, the operator will hear a faint "click" resulting from the dropping of pawl 67 over the points of teeth of ratchet wheel 63, and, immediately following said faint click, a louder "click" resulting from the dropping of push rod 57 off the high point of cam 58. The fourth set of "clicks" signals the arrival of the film at a new exposure position, and may be utilized, when desired, as an audible means of guaging the advancement of the film in the dark. That is to say, the operator will count the pairs of clicks produced at pawl 67 and cam 58 respectively, and will stop the winding operation when the fourth set of "clicks" has occurred. The occurrence of the second, louder "click" of this fourth pair will signal the positioning of the film in the exactly correct position for the next exposure. The preceding lighter "click" of pawl 67 serves as a warning signal.

It will now be apparent that I have provided a means for both visual and audible gauging of the position of the film in the film advancing operation.

I claim:

1. In a roll film holder for a press type camera, a housing having at one end a shallow portion for insertion into the camera and at its other end a deeper portion for enclosing a pair of film spools, a winding spindle for one of said spools, trunnions for the other spool, said spindle and trunnions being rotatably mounted in said deeper portion on axes transverse to and spaced longitudinally of said housing, a dial for indicating the position of the film in the housing, a ratchet wheel inside the housing intermediate said spindle and one of said trunnions, a pawl to operate said ratchet wheel, a roller at the end of said shallow portion, around which the film passes from one spool to the other, a cam on the end of said roller, and a push rod having one end bearing against said cam and its other end drivingly connected to said pawl, said push rod extending lengthwise through said shallow portion adjacent a side wall thereof.

2. In a roll film holder for a press type camera, a housing having a shallow portion for insertion into the camera and a deeper portion for enclosing a pair of film spools, a roller at the end of the shallow portion, around which the film passes from one spool to the other, a cam on an end of said roller, a push rod having one end actuated by said cam and extending longitudinally through said shallow portion into said deeper portion, a bell crank pivotally mounted in said deeper portion and having an arm pivoted to said push rod, a ratchet wheel journalled on the axis of said bell crank, a pawl carried by another arm of said bell crank and in driving engagement with said ratchet wheel, said push rod deriving advancing movement from said cam to rotate said ratchet wheel one step, and spring means acting against said bell crank to effect return movement of said push rod.

3. In a roll film holder for a press type camera, a housing having a shallow portion for insertion into the camera and a deeper portion for enclosing a pair of film spools, a roller at the end of the shallow portion, around which the film passes from one spool to the other, a cam on an end of said roller, a push rod having one end actuated by said cam and extending longitudinally through said shallow portion into said deeper portion, a lever pivotally mounted in said deeper portion and associated therewith to receive advancing movement transmitted through said push rod from said roller, a ratchet wheel journalled on the axis of said lever, a pawl carried by said lever and in driving engagement with said ratchet wheel, and spring means acting against said lever to effect return movement of said push rod.

4. In a roll film holder for a press type camera, a housing having a shallow portion for insertion into the camera and a deeper portion for enclosing a pair of film spools, a roller at the end of the shallow portion, around which the film passes from one spool to the other, a push rod, means converting rotary movement of said roller into reciprocating movement of said push rod, said push rod extending longitudinally through said shallow portion into said deeper portion, a lever pivotally mounted in said deeper portion and associated therewith to receive advancing movement transmitted through said push rod from said roller, a ratchet wheel journalled on the axis of said lever, a pawl carried by said lever and in driving engagement with said ratchet wheel.

5. A roll film holder as defined in claim 4, wherein said shallow housing portion has therein a longitudinal channel in which said push rod is slidably received.

6. In a roll film holder for a press type camera, a housing having at one end a shallow portion for insertion into the camera and at its other end a deeper portion for enclosing a pair of film spools, a winding spindle for one of said spools, trunnions for the other spool, said spindle and trunnions being rotatably mounted in said deeper portion on axes transverse to and spaced longitudinally of said housing, a platen around which the film travels from one spool to the other, said platen providing a bearing surface for supporting a section of film in a position for exposure, said deeper housing portion being offset rearwardly from said shallow portion and said trunnions and winding spindle having their axes disposed in a plane offset rearwardly from the plane of said platen, the film passing from the platen to the remote spool, bearing against the film on the near spool and applying a braking action upon said near spool to restrain coasting thereof.

7. In a roll film holder for a press type camera, a housing having at one end a shallow portion for insertion into the camera and at its other end a deeper portion for enclosing a pair of film spools, a winding spindle disposed adjacent the outer end of said deeper housing portion, for mounting one end of one of said spools, a pair of trunnions disposed adjacent the inner end of said deeper housing portion, for mounting the other spool, said spindle and trunnions being rotatably mounted in said deeper portion on axes transverse to and spaced longitudinally of said housing, and a platen in said shallow housing portion, around which the film travels from one spool to the other, said platen providing a bearing surface for supporting a section of film in a position for exposure thereof, said deeper housing portion being offset rearwardly from said shallow portion so that the film travels from the platen to the winding spool in a diagonal stretch, the other spool being positioned so that the film thereon will engage said diagonal stretch so as to restrain said other spool from coasting.

8. In a roll film holder for a press type camera, a housing having at one end a shallow portion for insertion into the camera and at its other end a deeper portion for enclosing a pair of film spools, a pair of trunnions for the other spool, said spindle and trunnions being rotatably mounted in said deeper portion on axes transverse to and spaced longitudinally of said housing, a winding spindle for one of said spools, a platen around which the film travels from one spool to the other, said platen providing a bearing surface for supporting a section of film in a position for exposure, said platen being of sheet metal and having a pair of ears projecting from its outer corners, said ears being bent at right angles to the plane of said platen, and a roller journalled in said ears, the film travelling around said roller and back across the bearing face of said platen.

LYSLE G. TATRO.

REFERENCES CITED

The following references are of record in the file of this patent:

UNITED STATES PATENTS

| Number | Name | Date |
|---|---|---|
| 684,221 | Gill | Oct. 8, 1901 |
| 1,067,971 | Buller | July 22, 1913 |
| 1,191,632 | Whatley | July 18, 1916 |
| 1,213,694 | Schultz | Jan. 23, 1917 |